United States Patent
Sheraizin et al.

(10) Patent No.: US 7,095,903 B2
(45) Date of Patent: *Aug. 22, 2006

(54) METHOD AND APPARATUS FOR VISUAL LOSSLESS IMAGE SYNTACTIC ENCODING

(75) Inventors: Semion Sheraizin, Mazkeret Batya (IL); Vitaly Sheraizin, Mazkeret Batya (IL)

(73) Assignee: VLS Com Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/036,062

(22) Filed: Jan. 18, 2005

(65) Prior Publication Data
US 2005/0123208 A1    Jun. 9, 2005

Related U.S. Application Data

(63) Continuation of application No. 10/121,685, filed on Apr. 15, 2002, now Pat. No. 6,952,500, which is a continuation of application No. 09/524,618, filed on Mar. 14, 2000, now Pat. No. 6,473,532.

(30) Foreign Application Priority Data
Jan. 23, 2000   (IL)   ................................... 134182

(51) Int. Cl.
    *G06K 9/38*   (2006.01)

(52) U.S. Cl. ..................................... 382/270; 382/263
(58) Field of Classification Search ................ 382/162, 382/264, 270, 263
    See application file for complete search history.

(56) References Cited

U.S. PATENT DOCUMENTS 5,974,159 A * 10/1999 Lubin et al. ................. 382/106

* cited by examiner

*Primary Examiner*—Phuoc Tran
(74) *Attorney, Agent, or Firm*—Alphapatent Associates Ltd.; Daniel J. Swirsky

(57) ABSTRACT

A visual perception threshold unit for image processing identifies a plurality of visual perception threshold levels to be associated with the pixels of a video frame, wherein the threshold levels define contrast levels above which a human eye can distinguish a pixel from among its neighboring pixels of the video frame. The present invention also includes a method of generating visual perception thresholds by analysis of the details of the video frames, estimating the parameters of the details, and defining a visual perception threshold for each detail in accordance with the estimated detail parameters. The present invention further includes a method of describing images by determining which details in the image can be distinguished by the human eye and which ones can only be detected by it.

4 Claims, 15 Drawing Sheets

METHOD AND APPARATUS FOR VISUAL LOSSLESS IMAGE SYNTACTIC ENCODING

CROSS-REFERENCE TO RELATED APPLICATIONS

This application is a continuation application of U.S. Ser. No. 10/121,685, filed Apr. 15, 2002, now U.S. Pat. No. 6,952,500, which is a continuation application of U.S. Ser. No. 09/524,618, filed Mar. 14, 2000, issued as U.S. Pat. No. 6,473,532, which patents are incorporated herein by reference.

FIELD OF THE INVENTION

The present invention relates generally to processing of video images and, in particular, to syntactic encoding of images for later compression by standard compression techniques.

BACKGROUND OF THE INVENTION

There are many types of video signals, such as digital broadcast television (TV), video conferencing, interactive TV, etc. All of these signals, in their digital form, are divided into frames, each of which consists of many pixels (image elements), each of which requires 8–24 bits to describe them. The result is megabits of data per frame.

Before storing and/or transmitting these signals, they typically are compressed, using one of many standard video compression techniques, such as JPEG, MPEG, H-compression, etc. These compression standards use video signal transforms and intra- and inter-frame coding which exploit spatial and temporal correlations among pixels of a frame and across frames.

However, these compression techniques create a number of well-known, undesirable and unacceptable artifacts, such as blockiness, low resolution and wiggles, among others. These are particularly problematic for broadcast TV (satellite TV, cable TV, etc.) or for systems with very low bit rates (video conferencing, videophone).

Much research has been performed to try and improve the standard compression techniques. The following patents and articles discuss various prior art methods to do so:

U.S. Pat. Nos. 5,870,501, 5,847,766, 5,845,012, 5,796,864, 5,774,593, 5,586,200, 5,491,519, 5,341,442;

Raj Talluri et al, "A Robust, Scalable, Object-Based Video Compression Technique for Very Low Bit-Rate Coding," *IEEE Transactions of Circuit and Systems for Video Technology*, vol. 7, No. 1, February 1997;

AwadKh. Al-Asmari, "An Adaptive Hybrid Coding Scheme for HDTV and Digital Sequences," *IEEE Transactions on Consumer Electronics*, vol. 42, No. 3, pp. 926–936, August 1995;

Kwok-tung Lo and Jian Feng, "Predictive Mean Search Algorithms for Fast VQ Encoding of Images," *IEEE Transactions On Consumer Electronics*, vol. 41, No. 2, pp. 327–331, May 1995;

James Goel et al. "Pre-processing for MPEG Compression Using Adaptive Spatial Filtering", *IEEE Transactions On Consumer Electronics*, vol. 41, No. 3, pp. 687–698, August 1995;

Jian Feng et al. "Motion Adaptive Classified Vector Quantization for ATM Video Coding", *IEEE Transactions on Consumer Electronics*, vol. 41, No. 2, p. 322–326, May 1995;

Austin Y. Lan et al., "Scene-Context Dependent Reference—Frame Placement for MPEG Video Coding," *IEEE Transactions on Circuits and Systems for Video Technology*, vol. 9, No.3, pp. 478–489, April 1999;

Kuo-Chin Fan, Kou-Sou Kan, "An Active Scene Analysis-Based approach for Pseudoconstant Bit-Rate Video Coding", *IEEE Transactions on Circuits and Systems for Video Technology*, vol. 8 No.2, pp. 159–170, April 1998;

Takashi Ida and Yoko Sambansugi, "Image Segmentation and Contour Detection Using Fractal Coding", *IEEE Transactions on Circuits and Systems for Video Technology*, vol. 8, No. 8, pp. 968–975, December 1998;

Liang Shen and Rangaraj M. Rangayyan, "A Segmentation-Based Lossless Image Coding Method for High-Resolution Medical Image Compression," *IEEE Transactions on Medical Imaging*, vol. 16, No. 3, pp. 301–316, June 1997;

Adrian Munteanu et al., "Wavelet-Based Lossless Compression of Coronary Angiographic Images", *IEEE Transactions on Medical Imaging*, vol. 18, No. 3, p. 272–281, March 1999; and Akira Okumura et al., "Signal Analysis and Compression Performance Evaluation of Pathological Microscopic Images," *IEEE Transactions on Medical Imaging*, vol. 16, No. 6, pp. 701–710, December 1997.

SUMMARY OF THE INVENTION

An object of the present invention is to provide a method and apparatus for video compression which is generally lossless vis-à-vis what the human eye perceives.

There is therefore provided, in accordance with a preferred embodiment of the present invention, a visual perception threshold unit for image processing. The threshold unit identifies a plurality of visual perception threshold levels to be associated with the pixels of a video frame, wherein the threshold levels define contrast levels above which a human eye can distinguish a pixel from among its neighboring pixels of the video frame.

There is also provided, in accordance with a preferred embodiment of the present invention, the visual perception threshold unit which includes a parameter generator and a threshold generator. The parameter generator generates a multiplicity of parameters that describe at least some of the information content of the processed frame. From the parameters, the threshold generator generates a plurality of visual perception threshold levels to be associated with the pixels of the video frame. The threshold levels define contrast levels above which a human eye can distinguish a pixel from among its neighboring pixels of the frame.

Moreover, in accordance with a preferred embodiment of the present invention, the parameter generator includes a volume unit, a color unit, an intensity unit or some combination of the three. The volume unit determines the volume of information in the frame, the color unit determines the per pixel color and the intensity unit determines a cross-frame change of intensity.

There is also provided, in accordance with a preferred embodiment of the present invention, a method for generating visual perception thresholds. The method includes analysis of the details of the frames of a video signal, estimating the parameters of the details, and defining a visual perception threshold for each detail in accordance with the estimated detail parameters.

There is also provided, in accordance with a preferred embodiment of the present invention, a method for describing images. The method includes determining which details in the image can be distinguished by the human eye and which ones can only be detected by it.

Moreover, in accordance with a preferred embodiment of the present invention, the method also includes providing one bit to describe a pixel which can only be detected by the human eye, and providing three bits to describe a pixel which can be distinguished by the human eye.

Further, in accordance with a preferred embodiment of the present invention, the method also includes smoothing the data of less-distinguished details.

Finally, in accordance with a preferred embodiment of the present invention, the step of determining details also includes identifying areas of high contrast and areas whose details have small dimensions.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Applicants have realized that there are different levels of image detail in an image and that the human eye perceives these details in different ways. In particular, Applicants have realized the following:

1. Picture details whose detection mainly depends on the level of noise in the image occupy approximately 50–80% of an image.
2. A visual perception detection threshold for image details does not depend on the shape of the details in the image.
3. A visual perception threshold THD depends on a number of picture parameters, including the general brightness of the image. It does not depend on the noise spectrum.

The present invention is a method for describing, and then encoding, images based on which details in the image can be distinguished by the human eye and which ones can only be detected by it.

Figure 1:
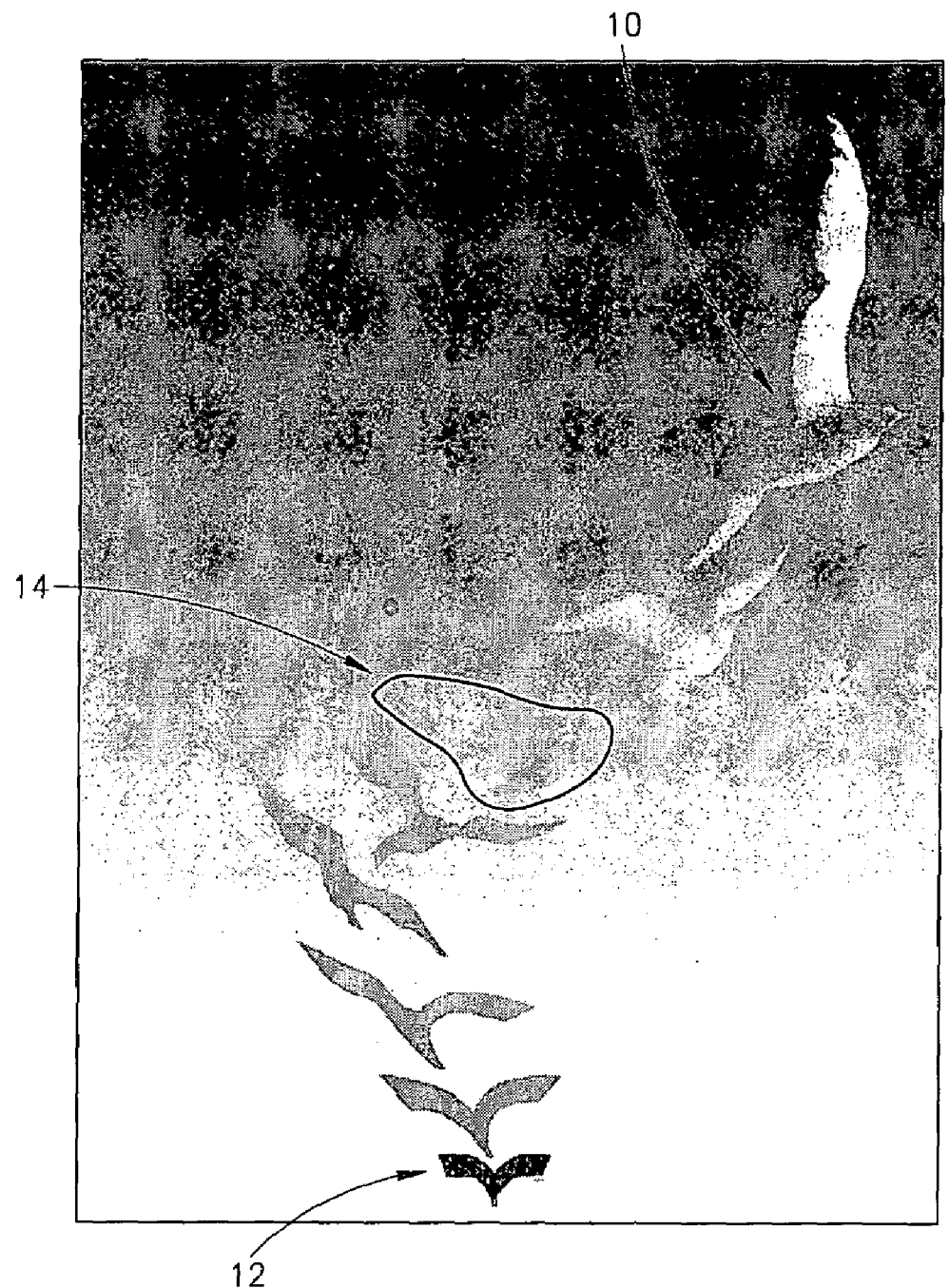
FIG. 1 is an example of a video frame.

Reference is now made to FIG. 1, which is a grey-scale image of a plurality of shapes of a bird in flight, ranging from a photograph of one (labeled 10) to a very stylized version of one (labeled 12). The background of the image is very dark at the top of the image and very light at the bottom of the image.

The human eye can distinguish most of the birds of the image. However, there is at least one bird, labeled 14, which the eye can detect but cannot determine all of its relative contrast details. Furthermore, there are large swaths of the image (in the background) which have no details in them.

The present invention is a method and system for syntactic encoding of video frames before they are sent to a standard video compression unit. The present invention separates the details of a frame into two different types, those that can only be detected (for which only one bit will suffice to describe each of their pixels) and those which can be distinguished (for which at least three bits are needed to describe the intensity of each of their pixels).

Figure 2:
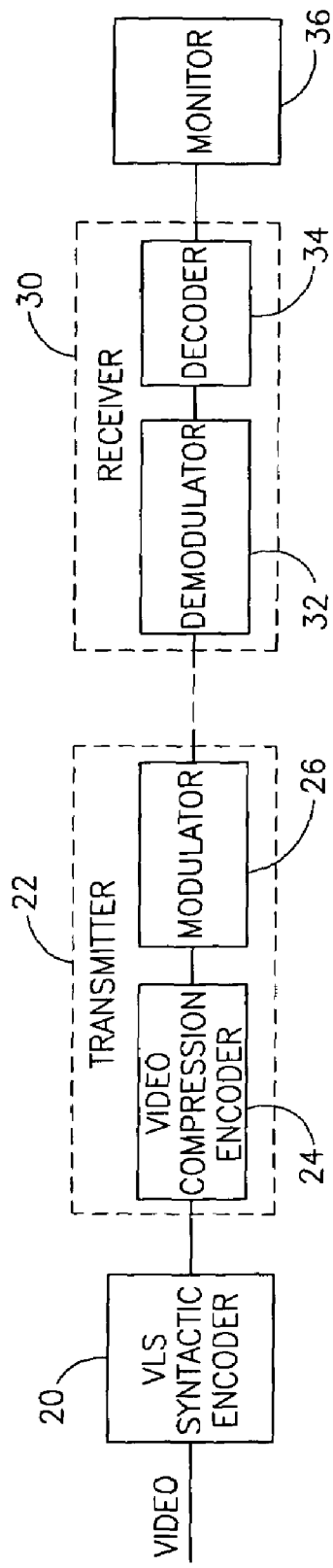
FIG. 2 is a block diagram illustration of a video compression system having a visual lossless syntactic encoder, constructed and operative in accordance with a preferred embodiment of the present invention.

Reference is now made to FIG. 2, which illustrates the present invention within an image transmission system. Thus, FIG. 2 shows a visual lossless syntactic (VLS) encoder 20 connected to a standard video transmitter 22 which includes a video compression encoder 24, such as a standard MPEG encoder, and a modulator 26. VLS encoder 20 transforms an incoming video signal such that video compression encoder 24 can compress the video signal two to five times more than video compression encoder 24 can do on its own, resulting in a significantly reduced volume bit stream to be transmitted.

Modulator 26 modulates the reduced volume bit stream and transmits it to a receiver 30, which, as in the prior art, includes a demodulator 32 and a decoder 34. Demodulator 32 demodulates the transmitted signal and decoder 34 decodes and decompresses the demodulated signal. The result is provided to a monitor 36 for display.

It will be appreciated that, although the compression ratios are high in the present invention, the resultant video displayed on monitor 36 is not visually degraded. This is because encoder 20 attempts to quantify each frame of the video signal according to which sections of the frame are more or less distinguished by the human eye. For the less-distinguished sections, encoder 20 either provides pixels of a minimum bit volume, thus reducing the overall bit volume of the frame or smoothes the data of the sections such that video compression encoder 24 will later significantly compress these sections, thus resulting in a smaller bit volume in the compressed frame. Since the human eye does not distinguish these sections, the reproduced frame is not perceived significantly differently than the original frame, despite its smaller bit volume.

Figure 3:
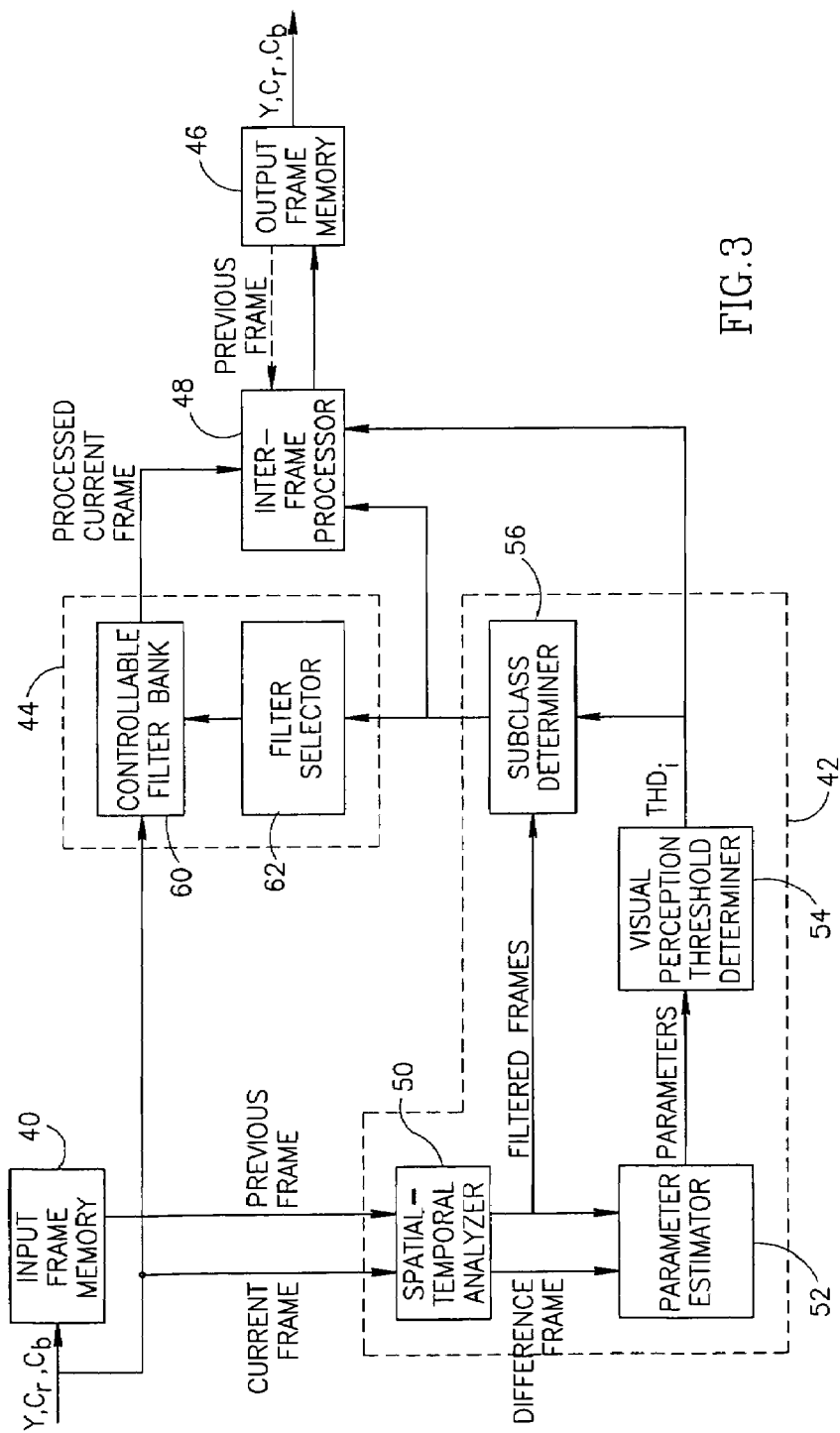
FIG. 3 is a block diagram illustration of the details of the visual lossless syntactic encoder of FIG. 2.

Reference is now made to FIG. 3, which details the elements of VLS encoder 20. Encoder 20 comprises an input frame memory 40, a frame analyzer 42, an intra-frame processor 44, an output frame memory 46 and an inter-frame processor 48. Analyzer 42 analyzes each frame to separate it into subclasses, where subclasses define areas whose pixels cannot be distinguished from each other. Intra-frame processor 44 spatially filters each pixel of the frame according to its subclass and, optionally, also provides each pixel of the frame with the appropriate number of bits. Inter-frame processor 48 provides temporal filtering (i.e. inter-frame filtering) and updates output frame memory 46 with the elements of the current frame which are different than those of the previous frame.

It is noted that frames are composed of pixels, each having luminance Y and two chrominance $C_r$ and $C_b$ components, each of which is typically defined by eight bits. VLS encoder 20 generally separately processes the three components. However, the bandwidth of the chrominance signals is half as wide as that of the luminance signal. Thus, the filters (in the x direction of the frame) for chrominance have a narrower bandwidth. The following discussion shows the filters for the luminance signal Y.

Frame analyzer 42 comprises a spatial-temporal analyzer 50, a parameter estimator 52, a visual perception threshold determiner 54 and a subclass determiner 56. Details of these elements are provided in FIGS. 9–11, discussed hereinbelow.

As discussed hereinabove, details which the human eye distinguishes are ones of high contrast and ones whose details have small dimensions. Areas of high contrast are areas with a lot of high frequency content. Thus, spatial-temporal analyzer 50 generates a plurality of filtered frames from the current frame, each filtered through a different high pass filter (HPF), where each high pass filter retains a different range of frequencies therein.

Figure 4:
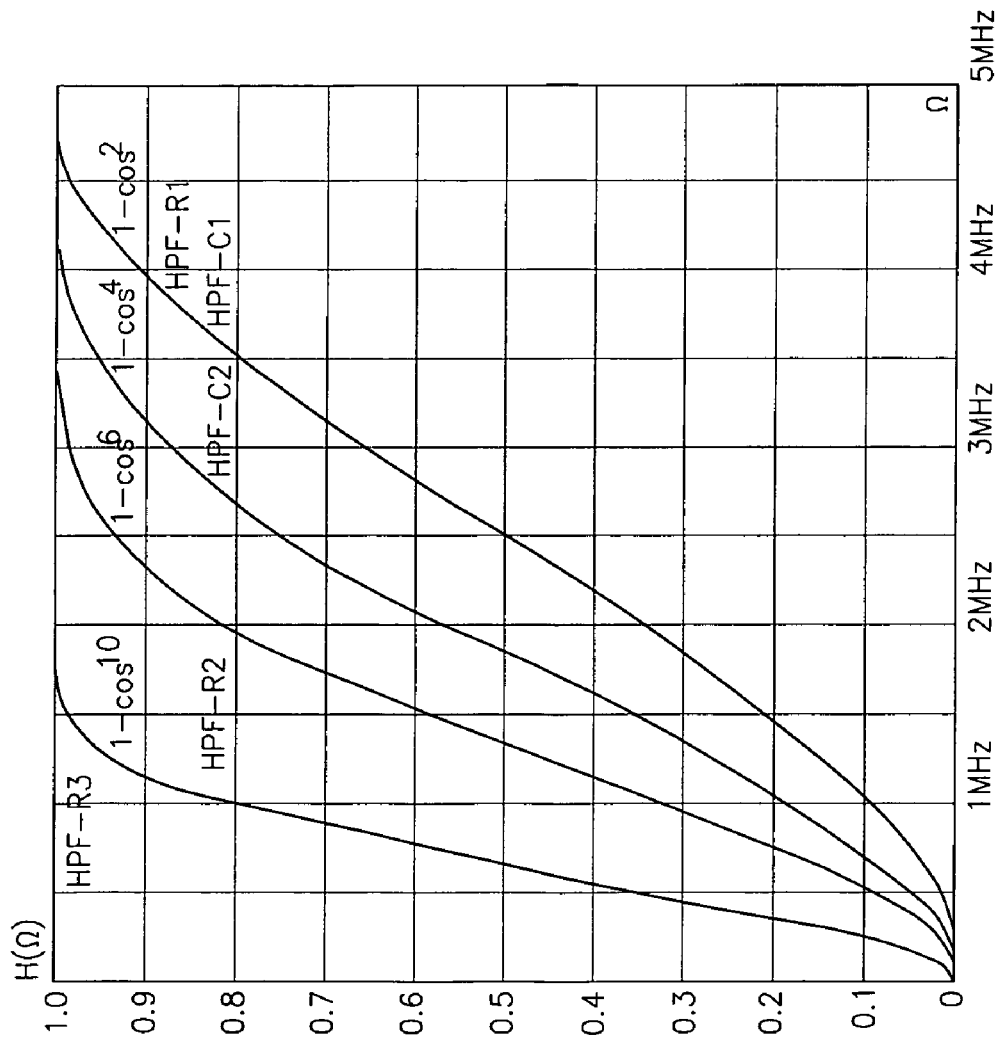
FIG. 4 is a graphical illustration of the transfer functions for a number of high pass filters useful in the syntactic encoder of FIG. 3.

FIG. 4, to which reference is now briefly made, is an amplitude vs. frequency graph illustrating the transfer functions of an exemplary set of high pass filters for frames in a non-interlacing scan format. Four graphs are shown. It can be seen that the curve labeled HPF-R3 has a cutoff frequency of 1 MHz and thus, retains portions of the frame with information above 1 MHz. Similarly, curve HPF-R2 has a cutoff frequency of 2 MHz, HPF-C2 has a cutoff frequency of 3 MHz and HPF-R1 and HPF-C1 have a cutoff frequency of 4 MHz. As will be discussed hereinbelow, the terminology "Rx" refers to operations on a row of pixels while the terminology "Cx" refers to operations on a column of pixels.

In particular, the filters of FIG. 4 implement the following finite impulse response (FIR) filters on either a row of pixels (the x direction of the frame) or a column of pixels (the y direction of the frame), where the number of pixels used in the filter defines the power of the cosine. For example, a filter implementing $\cos^{10} x$ takes 10 pixels around the pixel of interest, five to one side and five to the other side of the pixel of interest.

HPF-R3: $1-\cos^{10} x$
HPF-R2: $1-\cos^{6} x$
HPF-R1: $1-\cos^{2} x$
HPF-C2: $1-\cos^{4} y$
HPF-C1: $1-\cos^{2} y$ The high pass filters can also be considered as digital equivalents of optical apertures. The higher the cut-off frequency, the smaller the aperture. Thus, filters HPF-R1 and HPF-C1 retain only very small details in the frame (of 1–4 pixels in size) while filter HPF-R3 retains much larger details (of up to 11 pixels).

In the following, the filtered frames will be labeled by the type of filter (HPF-X) used to create them.

Returning to FIG. 3, analyzer 50 also generates difference frames between the current frame and another, earlier frame. The previous frame is typically at most 15 frames earlier. A "group" of pictures or frames (GOP) is a series of frames for which difference frames are generated.

Parameter estimator 52 takes the current frame and the filtered and difference frames and generates a set of parameters that describe the information content of the current frame. The parameters are determined on a pixel-by-pixel basis or on a per frame basis, as relevant. It is noted that the parameters do not have to be calculated to great accuracy as they are used in combination to determine a per pixel, visual perception threshold $THD_i$.

At least some of the following parameters are determined:

Signal to noise ratio (SNR): this parameter can be determined by generating a difference frame between the current frame and the frame before it, high pass filtering of the difference frame, summing the intensities of the pixels in the filtered frame, normalized by both the number of pixels N in a frame and the maximum intensity $I_{MAX}$ possible for the pixel. If the frame is a television frame, the maximum intensity is 255 quanta (8 bits). The highs frequency filter selects only those intensities lower than $3\sigma$, where $\sigma$ indicates a level less than which the human eye cannot perceive noise. For example, $\sigma$ can be 46 dB, equivalent to a reduction in signal strength of a factor of 200.

Normalized $N\Delta_i$: this measures the change $\Delta_i$, per pixel i, from the current frame to its previous frame. This value is then normalized by the maximum intensity $I_{MAX}$ possible for the pixel.

Normalized volume of intraframe change $NI_{XY}$: this measures the volume of change in a frame $I_{XY}$ (or how much detail there is in a frame), normalized by the maximum possible amount of information $MAX_{INFO}$ within a frame (i.e. 8 bits per pixel x N pixels per frame). Since the highest frequency range indicates the amount of change in a frame, the volume of change $I_{XY}$ is a sum of the intensities in the filtered frame having the highest frequency range, such as filtered frame HPF-R1.

Normalized volume of interframe changes $NI_F$: this measures the volume of changes $I_F$ between the current frame and its previous frame, normalized by the maximum possible amount of information $MAX_{INFO}$ within a frame. The volume of interframe changes $I_F$ is the sum of the intensities in the difference frame.

Normalized volume of change within a group of frames $NI_{GOP}$: this measures the volume of changes $I_{GOP}$ over a group of frames, where the group is from 2 to 15 frames, as selected by the user. It is normalized by the maximum possible amount of information $MAX_{INFO}$ within a frame and by the number of frames in the group.

Normalized luminance level $NY_i$: $Y_i$ is the luminance level of a pixel in the current frame. It is normalized by the maximum intensity $I_{MAX}$ possible for the pixel.

Color saturation $p_i$: this is the color saturation level of the ith pixel and it is determined by:

$$\left[0.78\left(\frac{C_{r,i}-128}{160}\right)^2 + 0.24\left(\frac{C_{b,i}-128}{126}\right)^2\right]^{1/2}$$

where $C_{r,i}$ and $C_{b,i}$ are the chrominance levels of the ith pixel.

Hue $h_i$: this is the general hue of the ith pixel and is determined by:

$$\arctan\left(1.4\frac{C_{r,i}-128}{C_{b,i}-128}\right).$$

Alternatively, hue $h_i$ can be determined by interpolating Table 1, below.

Response to hue $R_i(h_i)$: this is the human vision response to a given hue and is given by Table 1, below. Interpolation is typically used to produce a specific value of the response R(h) for a specific value of hue h.

TABLE 1

| Color | Y | $C_r$ | $C_b$ | h (nm) | R(h) |
|---|---|---|---|---|---|
| White | 235 | 128 | 128 | — | — |
| Yellow | 210 | 16 | 146 | 575 | 0.92 |
| Cyan | 170 | 166 | 16 | 490 | 0.21 |
| Green | 145 | 54 | 34 | 510 | 0.59 |
| Magenta | 106 | 202 | 222 | — | 0.2 |
| Red | 81 | 90 | 240 | 630 | 0.3 |
| Blue | 41 | 240 | 110 | 475 | 0.11 |
| Black | 16 | 128 | 128 | — | — |

Visual perception threshold determiner 54 determines the visual perception threshold $THD_i$ per pixel as follows:

$$THD_i = THD_{\min}(1 + N\Delta_i + NI_{XY} + NI_F + NI_{GOP} + NY_i + p_i + (1 - R_i(h_i)) + \frac{200}{SNR})$$

Subclass determiner 56 compares each pixel i of each high pass filtered frame HPF-X to its associated threshold $THD_j$ to determine whether or not that pixel is significantly present in each filtered frame, where "significantly present" is defined by the threshold level and by the "detail dimension" (i.e. the size of the object or detail in the image of which the pixel forms a part). Subclass determiner 56 then defines the subclass to which the pixel belongs.

For the example provided above, if the pixel is not present in any of the filtered frames, the pixel must belong to an object of large size or the detail is only detected but not distinguished. If the pixel is only found in the filtered frame of HPF-C2 or in both frames HPF-C1 and HPF-C2, it must be a horizontal edge (an edge in the Y direction of the frame). If it is found in filtered frames HPF-R3 and HPF-C2, it is a single small detail. If the pixel is found only in filtered frames HPF-R1, HPF-R2 and HPF-R3, it is a very small vertical edge. If, in addition, it is also found in filtered frame HPF-C2, then the pixel is a very small, single detail.

The above logic is summarized and expanded in Table 2.

TABLE 2

| | High Pass Filters | | | | |
|---|---|---|---|---|---|
| Subclass | R1 | R2 | R3 | C1 | C2 | Remarks |
| 1 | 0 | 0 | 0 | 0 | 0 | Large detail or detected detail only |
| 2 | 0 | 0 | 0 | 0 | 1 | Horizontal edge |
| 3 | 0 | 0 | 0 | 1 | 1 | Horizontal edge |
| 4 | 0 | 0 | 1 | 0 | 0 | Vertical edge |
| 5 | 0 | 0 | 1 | 0 | 1 | Single small detail |
| 6 | 0 | 0 | 1 | 1 | 1 | Single small detail |
| 7 | 0 | 1 | 1 | 0 | 0 | Vertical edge |
| 8 | 0 | 1 | 1 | 0 | 1 | Single small detail |
| 9 | 0 | 1 | 1 | 1 | 1 | Single small detail |
| 10 | 1 | 1 | 1 | 0 | 0 | Very small vertical edge |
| 11 | 1 | 1 | 1 | 0 | 1 | Very small single detail |
| 12 | 1 | 1 | 1 | 1 | 1 | Very small single detail |

The output of subclass determiner 56 is an indication of the subclass to which each pixel of the current frame belongs. Intra-frame processor 44 performs spatial filtering of the frame, where the type of filter utilized varies in accordance with the subclass to which the pixel belongs.

In accordance with a preferred embodiment of the present invention, intra-frame processor 44 filters each subclass of the frame differently and according to the information content of the subclass. The filtering limits the bandwidth of each subclass which is equivalent to sampling the data at different frequencies. Subclasses with a lot of content are sampled at a high frequency while subclasses with little content, such as a plain background area, are sampled at a low frequency.

Another way to consider the operation of the filters is that they smooth the data of the subclass, removing "noisiness" in the picture that the human eye does not perceive. Thus, intra-frame processor 44 changes the intensity of the pixel by an amount less than the visual distinguishing threshold for that pixel. Pixels whose contrast is lower than the threshold (i.e. details which were detected only) are transformed with non-linear filters. If desired, the data size of the detected only pixels can be reduced from 8 bits to 1 or 2 bits, depending on the visual threshold level and the detail dimension for the pixel. For the other pixels (i.e. the distinguished ones), 3 or 4 bits is sufficient.

Intra-frame processor 44 comprises a controllable filter bank 60 and a filter selector 62. Controllable filter bank 60 comprises a set of low pass and non-linear filters, shown in FIGS. 5A and 5B to which reference is now made, which filter selector 62 activates, based on the subclass to which the pixel belongs. Selector 62 can activate more than one filter, as necessary.

Figure 5A:
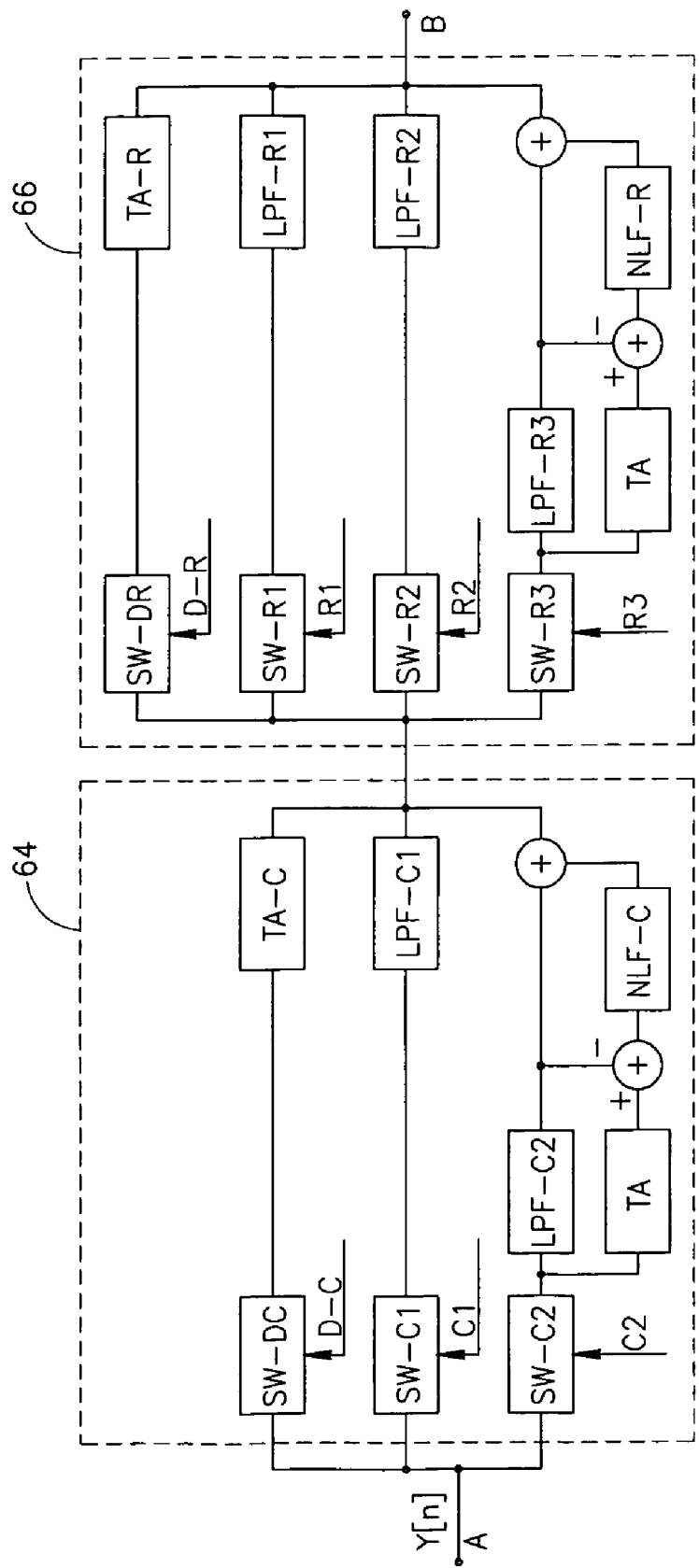
FIGS. 5A and 5B are block diagram illustrations of alternative embodiments of a controllable filter bank forming part of the syntactic encoder of FIG. 3.
Figure 5B:
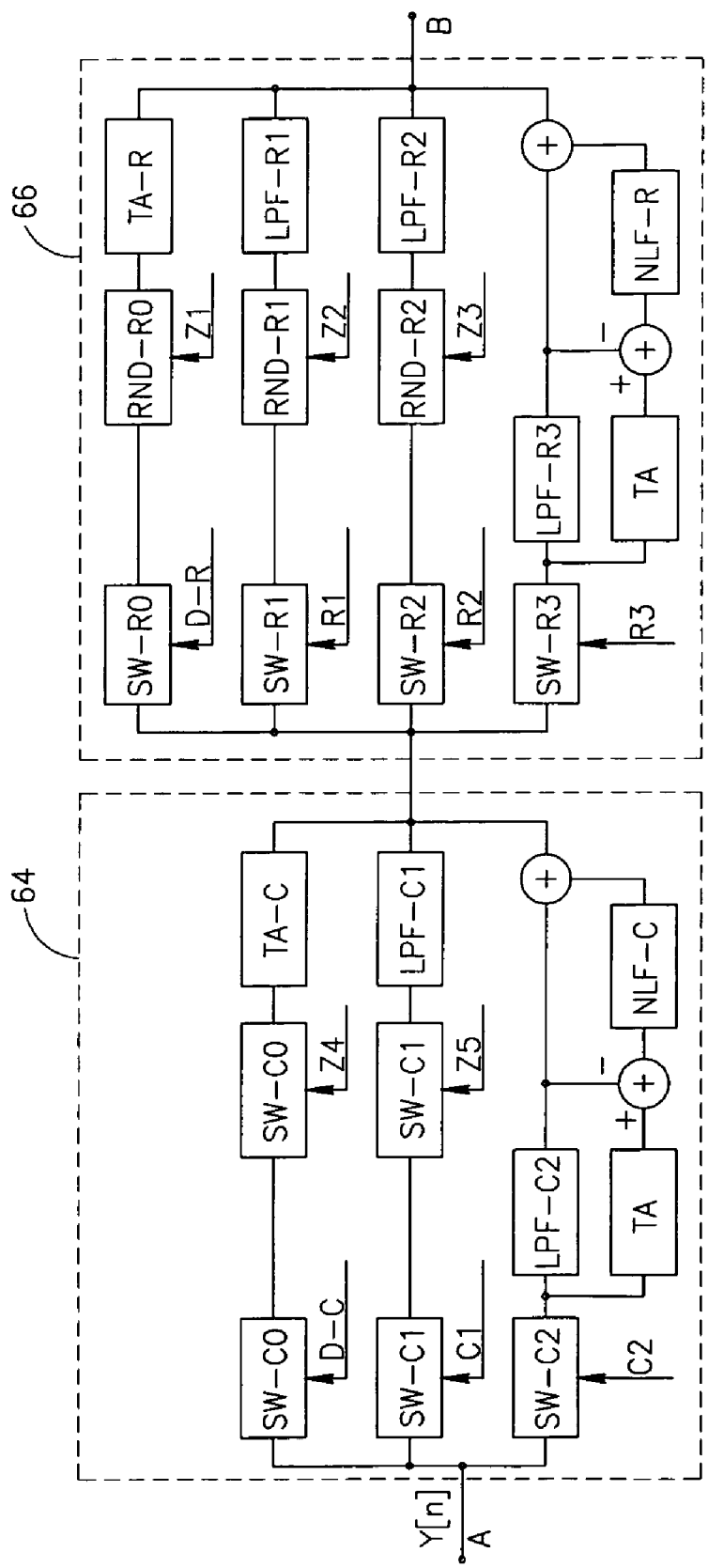

FIGS. 5A and 5B are two, alternative embodiments of controllable filter bank 60. Both comprise two sections 64 and 66 which operate on columns (i.e. line to line) and on rows (i.e. within a line), respectively. In each section 64 and 66, there is a choice of filters, each controlled by an appropriate switch, labeled SW-X, where X is one of C1, C2, R1, R2, R3 (selecting one of the low pass filters (LPF)), D-C, D-R (selecting to pass the relevant pixel directly). Filter selector 62 switches the relevant switch, thereby activating the relevant filter. It is noted that the non-linear filters NLF-R and NLF-C are activated by switches R3 and C2, respectively. Thus, the outputs of non-linear filters NLF-R and NLF-C are added to the outputs of low pass filters LPF-R3 and LPF-C2, respectively.

Controllable filter bank 60 also includes time aligners (TA) which add any necessary delays to ensure that the pixel currently being processed remains at its appropriate location within the frame.

The low pass filters (LPF) are associated with the high pass filters used in analyzer 50. Thus, the cutoff frequencies of the low pass filters are close to those of the high pass filters. The low pass filters thus pass that which their associated high pass filters ignore.

Figure 6:
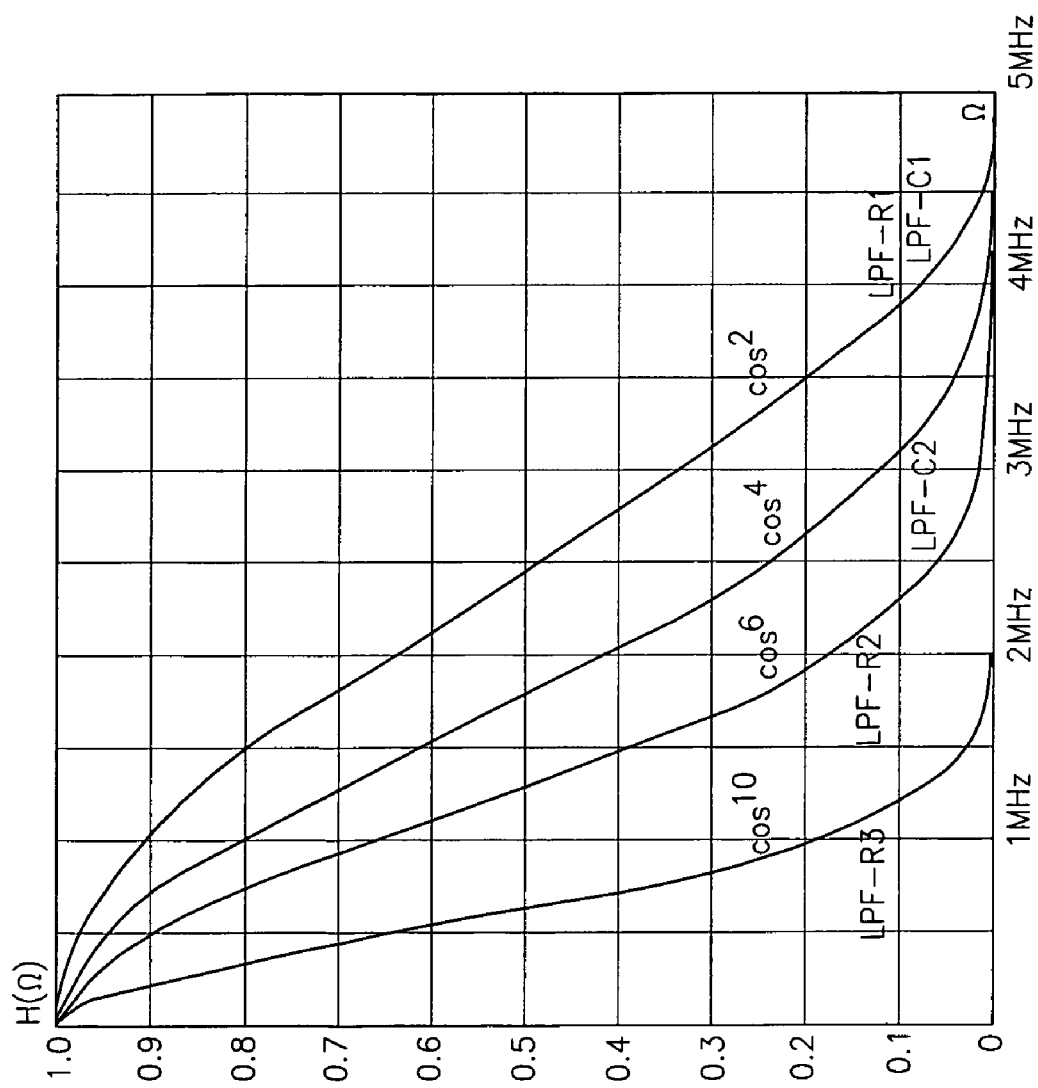
FIG. 6 is a graphical illustration of the transfer functions for a number of low pass filters useful in the controllable filter bank of FIGS. 5A and 5B.

FIG. 6, to which reference is now briefly made, illustrates exemplary low pass filters for the example provided hereinabove. Low pass filter LPF-R3 has a cutoff frequency of 0.5 MHz and thus, generally does not retain anything which its associated high pass filter HPF-R3 (with a cutoff frequency of 1 MHz) retains. Filter LPF-R2 has a cutoff frequency of 1 MHz, filter LPF-C2 has a cutoff frequency of 1.25 MHz and filters LPF-C1 and LPF-R1 have a cutoff frequency of about 2 MHz. As for the high frequency filters, filters LPF-Cx operate on the columns of the frame and filters LPF-Rx operate on the rows of the frame.

Figure 7:
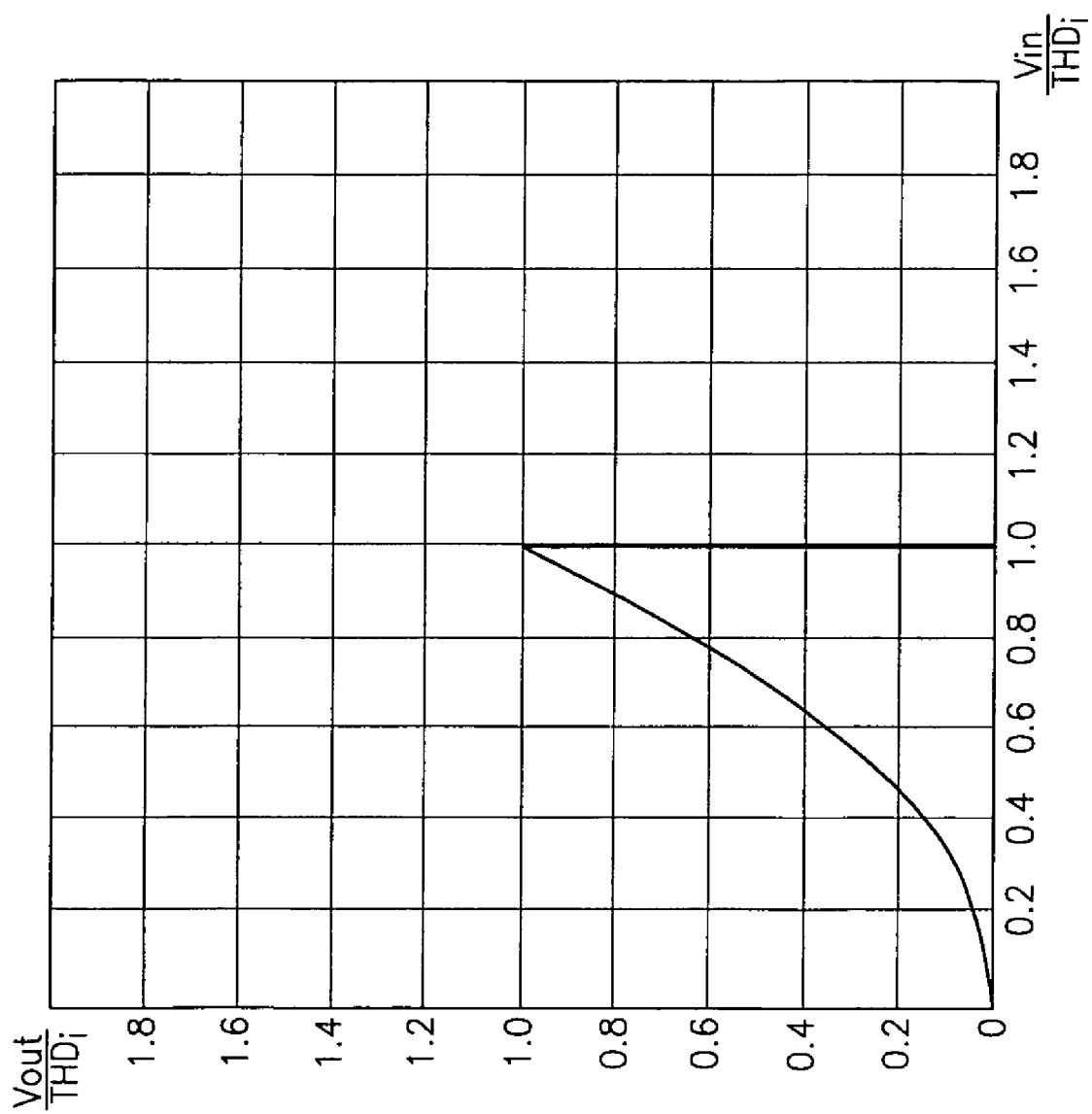
FIG. 7 is a graphical illustration of the transfer function for a non-linear filter useful in the controllable filter bank of FIGS. 5A and 5B.

FIG. 7, to which reference is now briefly made, illustrates an exemplary transfer function for the non-linear filters (NLF) which models the response of the eye when detecting a detail. The transfer function defines an output value Vout normalized by the threshold level $THD_i$ as a function of an input value Vin also normalized by the threshold level $THD_i$. As can be seen in the figure, the input-output relationship is described by a polynomial of high order. A typical order might be six, though lower orders, of power two or three, are also feasible.

Table 3 lists the type of filters activated per subclass, where the header for the column indicates both the type of filter and the label of the switch SW-X of FIGS. 5A and 5B.

TABLE 3

| | Low Pass Filters | | | | | | |
|---|---|---|---|---|---|---|---|
| Subclass | R1 | R2 | R3 | C1 | C2 | D-R | D-C |
| 1 | 0 | 0 | 1 | 0 | 1 | 0 | 0 |
| 2 | 0 | 0 | 1 | 1 | 0 | 0 | 0 |
| 3 | 0 | 0 | 1 | 0 | 0 | 0 | 1 |
| 4 | 0 | 1 | 0 | 0 | 1 | 0 | 0 |
| 5 | 0 | 1 | 0 | 1 | 0 | 0 | 0 |
| 6 | 0 | 1 | 0 | 0 | 0 | 0 | 1 |
| 7 | 1 | 0 | 0 | 0 | 1 | 0 | 0 |
| 8 | 1 | 0 | 0 | 1 | 0 | 0 | 0 |
| 9 | 1 | 0 | 0 | 0 | 0 | 0 | 1 |
| 10 | 0 | 0 | 0 | 0 | 1 | 1 | 0 |
| 11 | 0 | 0 | 0 | 1 | 0 | 1 | 0 |
| 12 | 0 | 0 | 0 | 0 | 0 | 1 | 1 |

FIG. 5B includes rounding elements RND which reduce the number of bits of a pixel from eight to three or four bits, depending on the subclass to which the pixel belongs. Table 4 illustrates the logic for the example presented hereinabove, where the items which are not active for the subclass are indicated by "N/A".

TABLE 4

| subclass | RND-R0 (Z1) | RND-R1 (Z2) | RND-R2 (Z3) | RND-C0 (Z4) | RND-C1 (Z5) |
|---|---|---|---|---|---|
| 1 | N/A | N/A | N/A | N/A | N/A |
| 2 | N/A | N/A | N/A | N/A | 4 bit |
| 3 | N/A | N/A | N/A | 4 bit | N/A |
| 4 | N/A | N/A | 4 bit | N/A | N/A |
| 5 | N/A | N/A | 4 bit | N/A | 4 bit |
| 6 | N/A | N/A | 4 bit | 4 bit | N/A |
| 7 | N/A | 4 bit | N/A | N/A | N/A |
| 8 | N/A | 3 bit | N/A | N/A | 3 bit |
| 9 | N/A | 3 bit | N/A | 3 bit | N/A |
| 10 | 4 bit | N/A | N/A | N/A | N/A |
| 11 | 3 bit | N/A | N/A | N/A | 3 bit |
| 12 | 3 bit | N/A | N/A | 3 bit | N/A |

The output of intra-frame processor 44 is a processed version of the current frame which uses fewer bits to describe the frame than the original version.

Figure 8A:
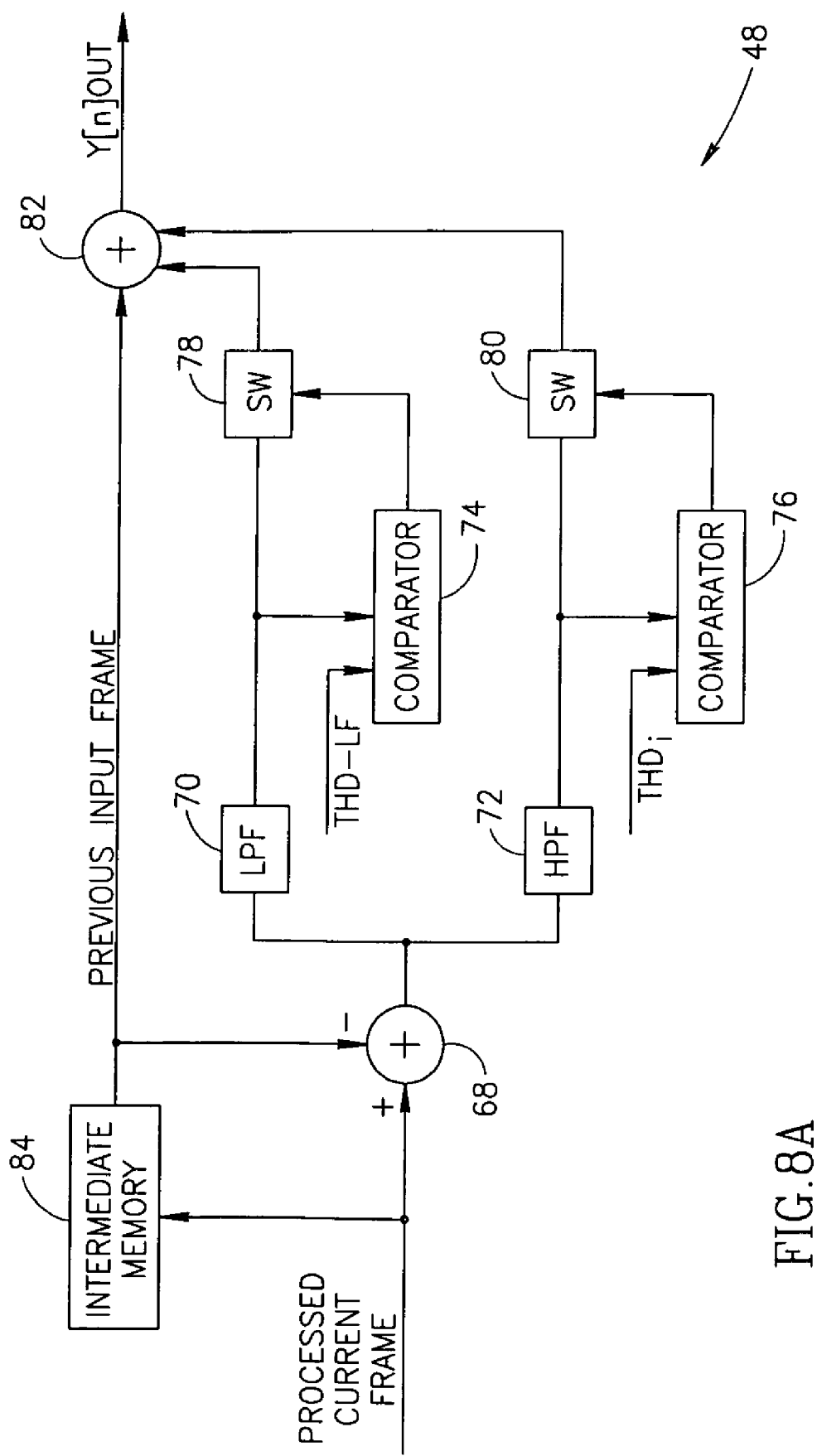
FIGS. 8A, 8B and 8C are block diagram illustrations of alternative embodiments of an inter-frame processor forming a controlled filter portion of the syntactic encoder of FIG. 3.
Figure 8B:
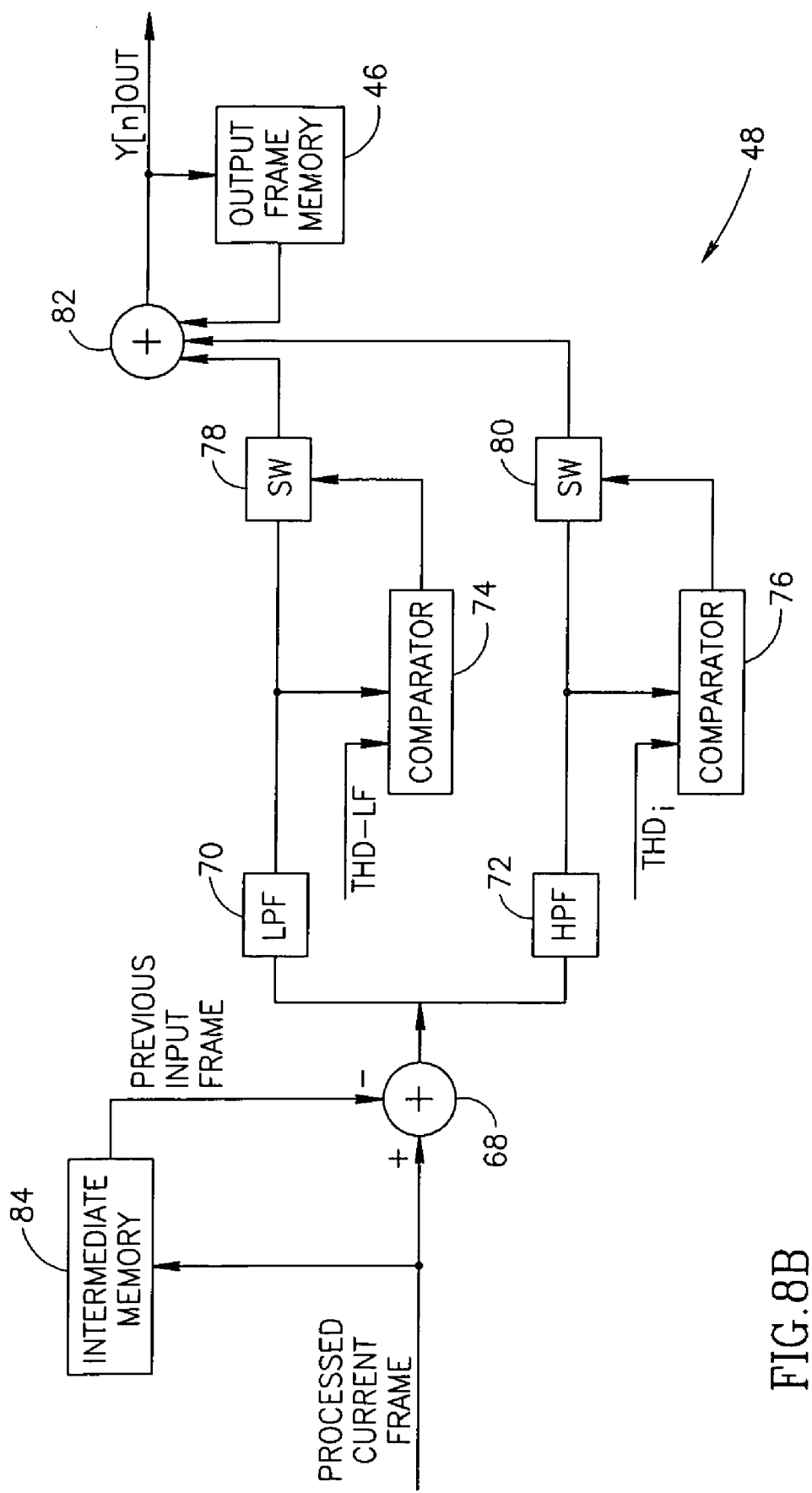
Figure 8C:
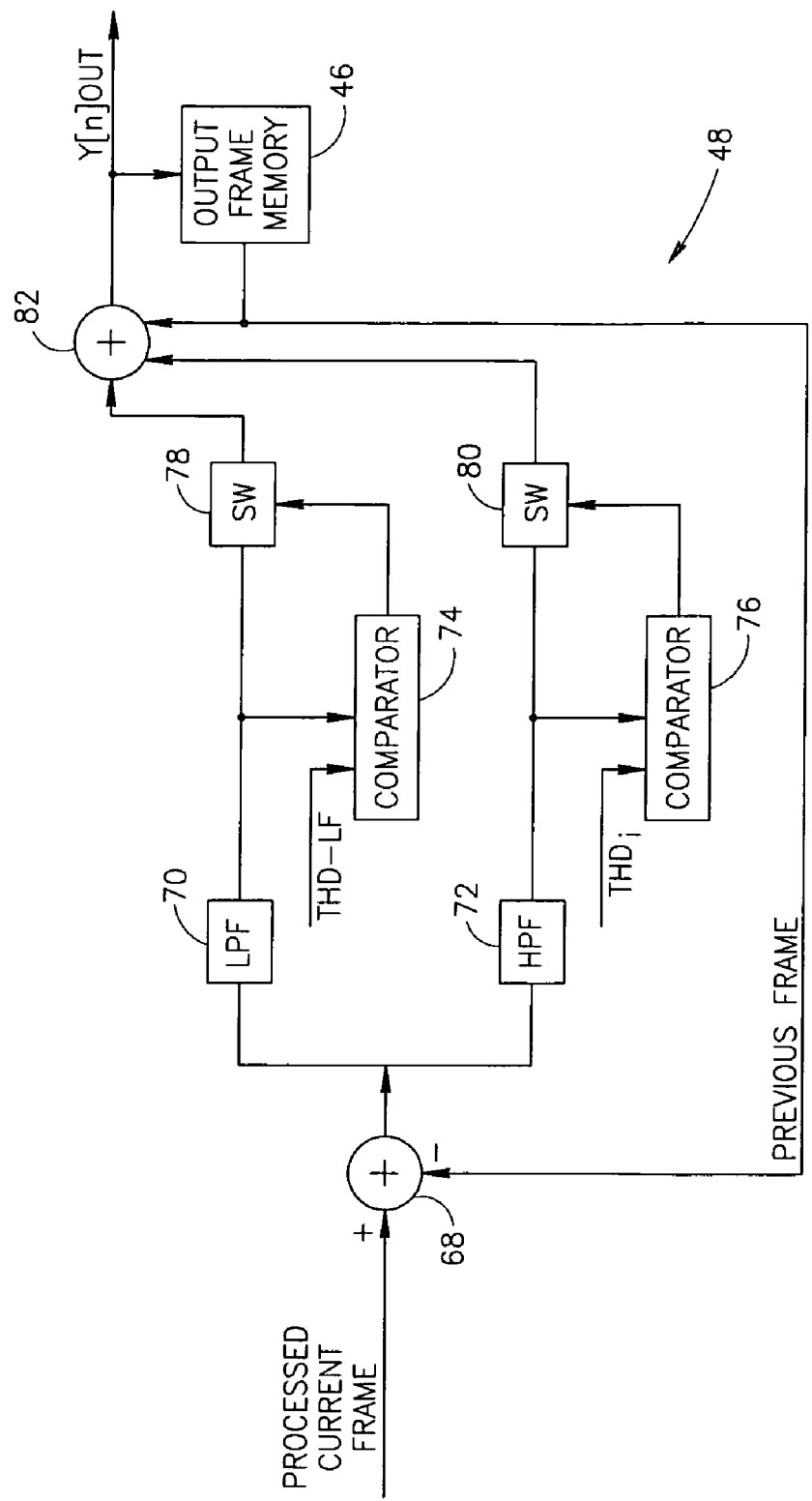

Reference is now made to FIGS. 8A, 8B and 8C, which illustrate three alternative embodiments for inter-frame processor 48 which provides temporal filtering (i.e. inter-frame filtering) to further process the current frame. Since the present invention provides a full frame as output, inter-frame processor 48 determines which pixels have changed significantly from the previous frame and amends those only, storing the new version in the appropriate location in output frame memory 46.

The embodiments of FIGS. 8A and 8B are open loop versions (i.e. the previous frame is the frame previously input into inter-frame processor 48) while the embodiment of FIG. 8C is a closed loop version (i.e. the previous frame is the frame previously produced by inter-frame processor 48). All of the embodiments comprise a summer 68, a low pass filter (LPF) 70, a high pass filter (HPF) 72, two comparators 74 and 76, two switches 78 and 80, controlled by the results of comparators 74 and 76, respectively, and a summer 82. FIGS. 8A and 8B additionally include an intermediate memory 84 for storing the output of intra-frame processor 44.

Summer 68 takes the difference of the processed current frame, produced by processor 44, and the previous frame, stored in either intermediate memory 84 (FIGS. 8A and 8B) or in frame memory 46 (FIG. 8C). The difference frame is then processed in two parallel tracks.

In the first track, the low pass filter is used. Each pixel of the filtered frame is compared to a general, large detail, threshold THD-LF which is typically set to 5% of the maximum expected intensity for the frame. Thus, the pixels which are kept are only those which changed by more than 5% (i.e. those whose changes can be "seen" by the human eye).

In the second track, the difference frame is high pass filtered. Since high pass filtering retains the small details, each pixel of the high pass filtered frame is compared to the particular threshold $THD_i$ for that pixel, as produced by threshold determiner 54. If the difference pixel has an intensity above the threshold $THD_i$ (i.e. the change in the pixel is significant for detailed visual perception), it is allowed through (i.e. switch 80 is set to pass the pixel).

Summer 82 adds the filtered difference pixels passed by switches 78 and/or 80 with the pixel of the previous frame to "produce the new pixel". If switches 78 and 80 did not pass anything, the new pixel is the same as the previous pixel. Otherwise, the new pixel is the sum of the previous pixel and the low and high frequency components of the difference pixel.

Reference is now briefly made to FIGS. 9, 10A, 10B and 11 which detail elements of frame analyzer 42. In these figures, the term "ML" indicates a memory line of the current frame, "MP" indicates a memory pixel of the current frame, "MF" indicates a memory frame, "VD" indicates the vertical drive signal, "TA" indicates a time alignment, e.g. a delay, and CNT indicates a counter.

Figure 9:
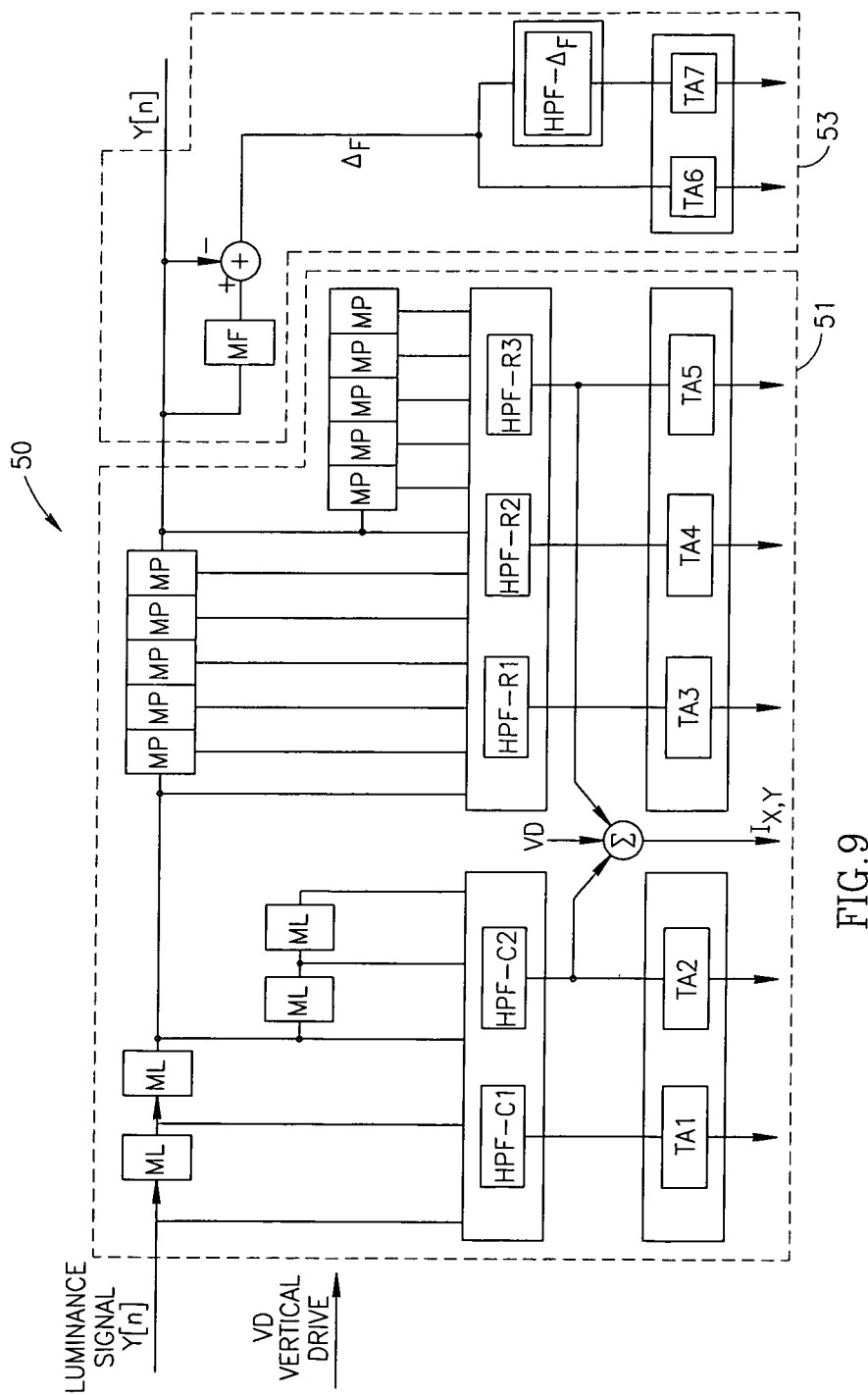
FIG. 9 is a block diagram illustration of a spatial-temporal analyzer forming part of the syntactic encoder of FIG. 3.
Figure 10A:
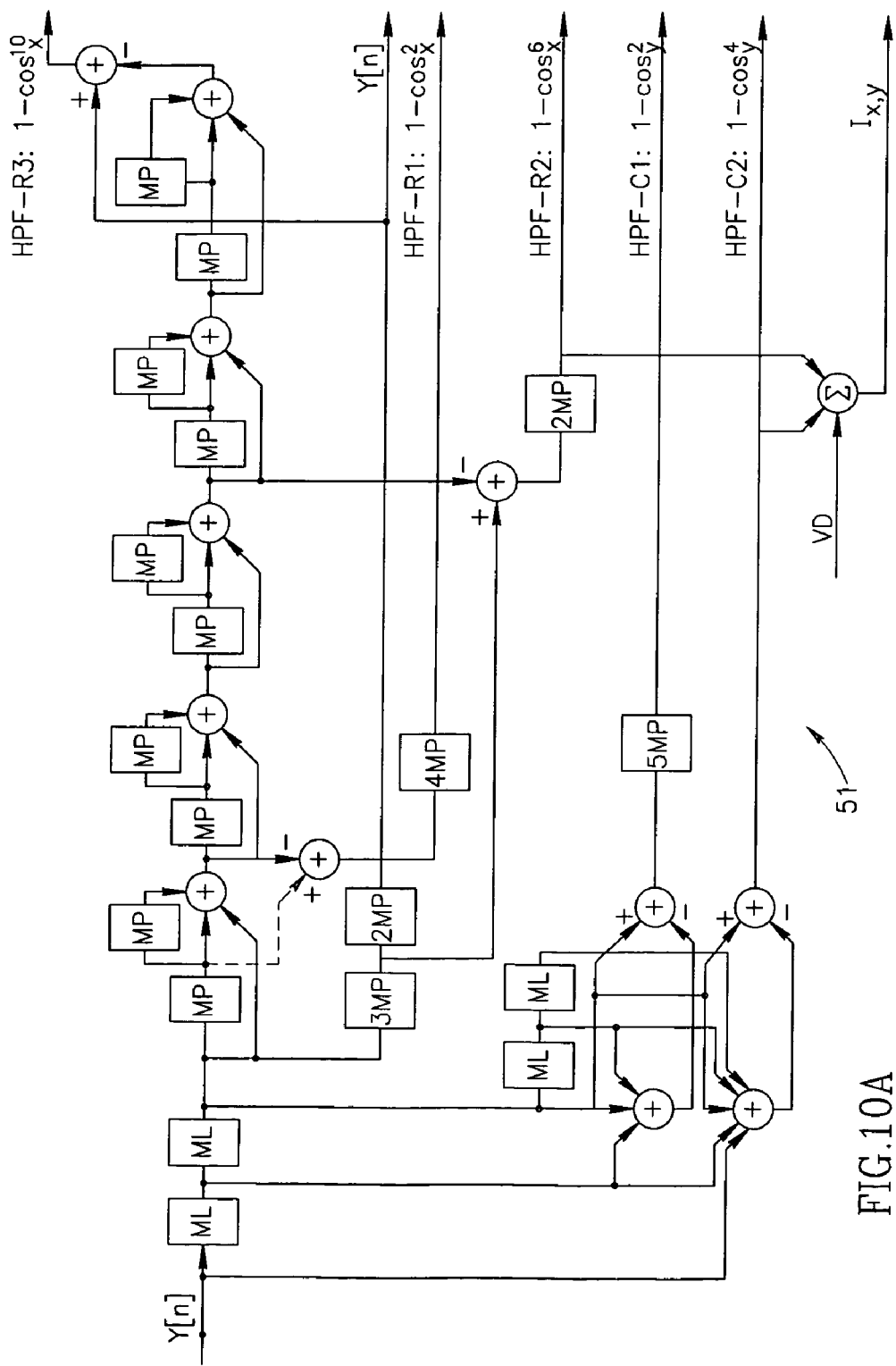
FIGS. 10A and 10B are detail illustrations of the analyzer of FIG. 9.
Figure 10B:
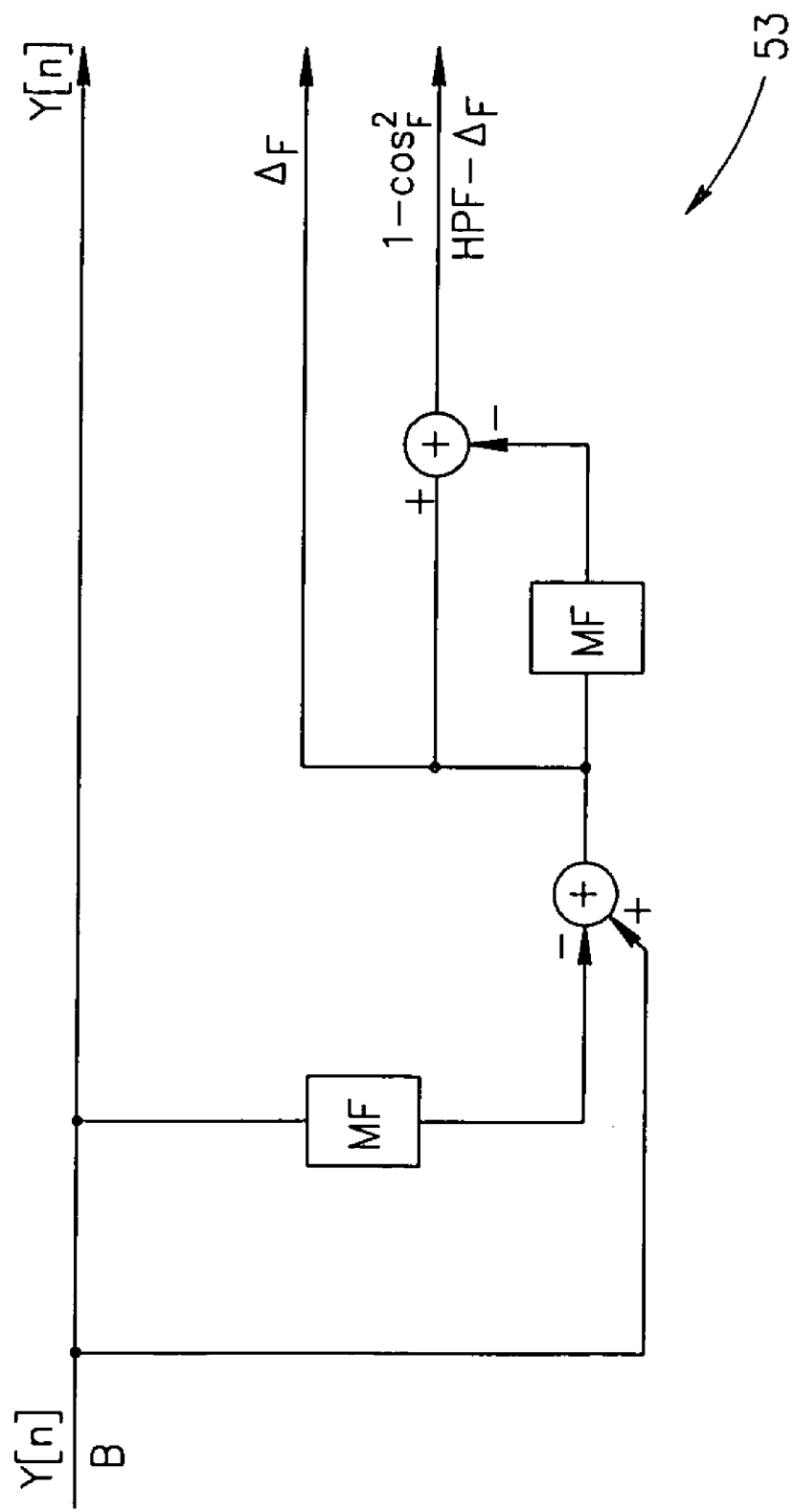
Figure 11:
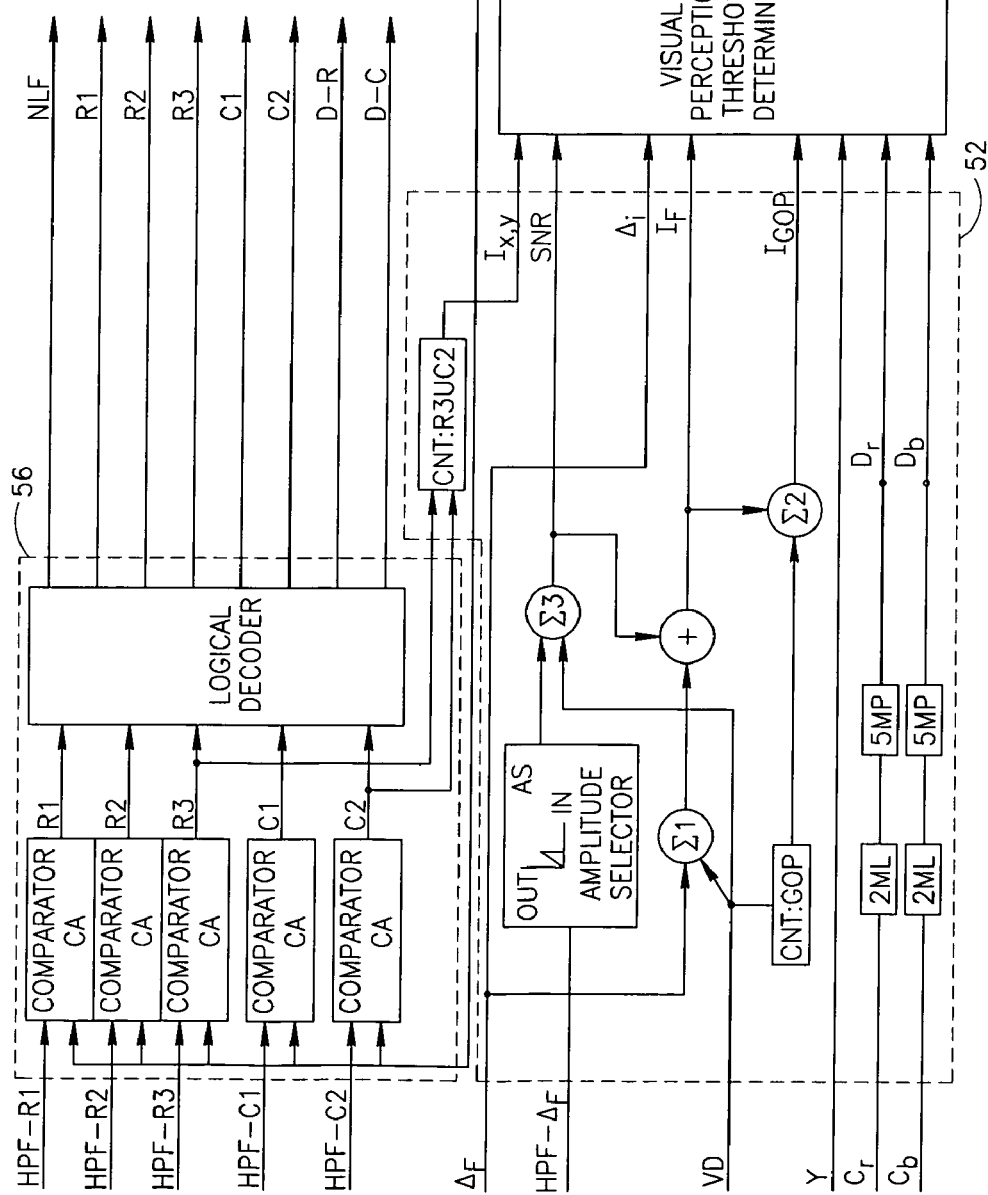
FIG. 11 is a detail illustration of a frame analyzer forming part of the syntactic encoder of FIG. 3.

FIG. 9 generally illustrates the operation of spatial-temporal analyzer 50 and FIGS. 10A and 10B provide one detailed embodiment for the spatial analysis and temporal analysis portions 51 and 53, respectively. FIG. 11 details parameter estimator 52, threshold determiner 54 and subclass determiner 56. As these figures are deemed to be self-explanatory, no further explanation will be included here.

It is noted that the present invention can be implemented with a field programmable gate array (FPGA) and the frame memory can be implemented with SRAM or SDRAM.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will be appreciated by persons skilled in the art that the present invention is not limited by what has been particularly shown and described herein above. Rather the scope of the invention is defined by the claims that follow:

What is claimed is:

1. A visual perception threshold unit for image processing, the threshold unit comprising:
   a parameter generator to generate a multiplicity of parameters that describe at least some of the information content of at least one frame to be processed; and
   a threshold generator to generate from said parameters, a plurality of visual perception threshold levels to be associated with the pixels of the video frame,
   wherein said threshold levels define contrast levels above which a human eye can distinguish a pixel from among its neighboring pixels of said frame.

2. A unit according to claim 1 and wherein said parameter generator comprises at least one of the following units:
   a volume unit which determines the volume of information in said at least one frame;
   a color unit which determines a per pixel color; and
   an intensity unit which determines a cross-frame change of intensity.

3. A method of generating visual perception thresholds for image processing, the method comprising:
   analyzing details of frames of a video signal;
   estimating parameters of said details; and
   defining a visual perception threshold for each of said details in accordance with said estimated detail parameters,
   wherein said estimating comprises at least one of the following:
   determining a per-pixel signal intensity change between a current frame and a previous frame, normalized by a maximum intensity;
   determining a normalized volume of intraframe change by high frequency filtering of said frame, summing the intensities of said filtered frame and normalizing the resultant sum by the maximum possible amount of information within a frame;
   generating a volume of inter-frame changes between a current frame and its previous frame normalized by said maximum possible amount of information volume within a frame;
   generating a normalized volume of inter-frame changes for a group of pictures from the output of said previous step of generating;
   evaluating a signal-to-noise ratio by high pass filtering a difference frame between said current frame and its said previous frame by selecting those intensities of said difference frame lower than a threshold defined as three times a noise level under which noise intensities are not perceptible to the human eye, summing the intensities of the pixels in the filtered frame and normalizing said sum by said maximum intensity and by the total number of pixels in a frame;
   generating a normalized intensity value per-pixel;
   generating a per-pixel color saturation level;
   generating a per-pixel hue value; and
   determining a per-pixel response to said hue value.

4. A method for describing an image, the method comprising
   determining which details in said image can be distinguished by the human eye and which ones can only be detected by it;
   providing one bit to describe a pixel which can only be detected by the human eye; and
   providing three bits to describe a pixel which can be distinguished by the human eye.

* * * * *